United States Patent
VanBlon et al.

(10) Patent No.: US 10,831,273 B2
(45) Date of Patent: Nov. 10, 2020

(54) USER ACTION ACTIVATED VOICE RECOGNITION

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 5 days.

(21) Appl. No.: 15/006,811

(22) Filed: Jan. 26, 2016

(65) Prior Publication Data

US 2017/0212590 A1 Jul. 27, 2017

(51) Int. Cl.
  *G09G 5/00* (2006.01)
  *G06F 3/01* (2006.01)
  *G06F 3/16* (2006.01)
  *G10L 17/22* (2013.01)

(52) U.S. Cl.
  CPC ............. *G06F 3/015* (2013.01); *G06F 3/017* (2013.01); *G06F 3/167* (2013.01); *G10L 17/22* (2013.01)

(58) Field of Classification Search
  CPC .................. G09G 3/2007; G09G 3/36; G09G 2320/0242; G09G 2360/144; G09G 2320/0666
  See application file for complete search history.

(56) References Cited

U.S. PATENT DOCUMENTS

| | | | | |
|---|---|---|---|---|
| 2010/0069123 | A1* | 3/2010 | Araradian | G06F 1/1626 455/566 |
| 2013/0127712 | A1* | 5/2013 | Matsubayashi | H04N 21/42203 345/158 |
| 2014/0214429 | A1* | 7/2014 | Pantel | G10L 21/16 704/275 |
| 2014/0379341 | A1* | 12/2014 | Seo | G10L 15/22 704/246 |
| 2015/0185854 | A1* | 7/2015 | Kauffmann | G06F 3/017 345/175 |
| 2015/0363070 | A1* | 12/2015 | Katz | G06F 3/017 715/852 |
| 2016/0299570 | A1* | 10/2016 | Davydov | G06F 1/163 |

\* cited by examiner

*Primary Examiner* — Adam R. Giesy
(74) *Attorney, Agent, or Firm* — Ference & Associates LLC

(57) ABSTRACT

One embodiment provides a method, including: receiving, from at least one sensor, data, wherein the data is based upon an action performed by a user; identifying, using a processor, the data as an activation cue; and activating, responsive to identifying the data as an activation cue, a voice response system. Other aspects are described and claimed.

18 Claims, 3 Drawing Sheets

USER ACTION ACTIVATED VOICE RECOGNITION

BACKGROUND

Information handling devices (e.g., smart phones, digital personal assistants, tablets, personal computers, etc.) may allow a user to provide input using voice input, in many cases, using natural language. The device may then perform an action based upon the received voice input. For example, a digital personal assistant may analyze the voice input and provide a response to a question posed by the user. As another example, a user may provide a voice input that a system transcribes into a document.

The ability to provide voice input and commands using natural language gives a user a natural and efficient way to utilize functions of a device's operating system or applications. However, one issue when utilizing voice input is determining which portion of the user's speech is intended to be received as the voice input or command. Thus, most applications and voice controlled assistants make use of a trigger to initiate the voice recognition process. The trigger then causes the application or voice controlled assistant to process any speech directly following the trigger.

BRIEF SUMMARY

In summary, one aspect provides a method, comprising: receiving, from at least one sensor, data, wherein the data is based upon an action performed by a user; identifying, using a processor, the data as an activation cue; and activating, responsive to identifying the data as an activation cue, a voice response system.

Another aspect provides an information handling device, comprising: at least one sensor; a processor operatively coupled to the at least one sensor; a memory device that stores instructions executable by the processor to: receive, from the at least one sensor, data, wherein the data is based upon an action performed by a user; identify the data as an activation cue; and activate, responsive to identifying the data as an activation cue, a voice response system.

A further aspect provides a product, comprising: a storage device that stores code executable by a processor, the code being executable by the processor and comprising: code that receives, from at least one sensor, data, wherein the data is based upon an action performed by a user; code that identifies the data as an activation cue; and code that activates, responsive to identifying the data as an activation cue, a voice response system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
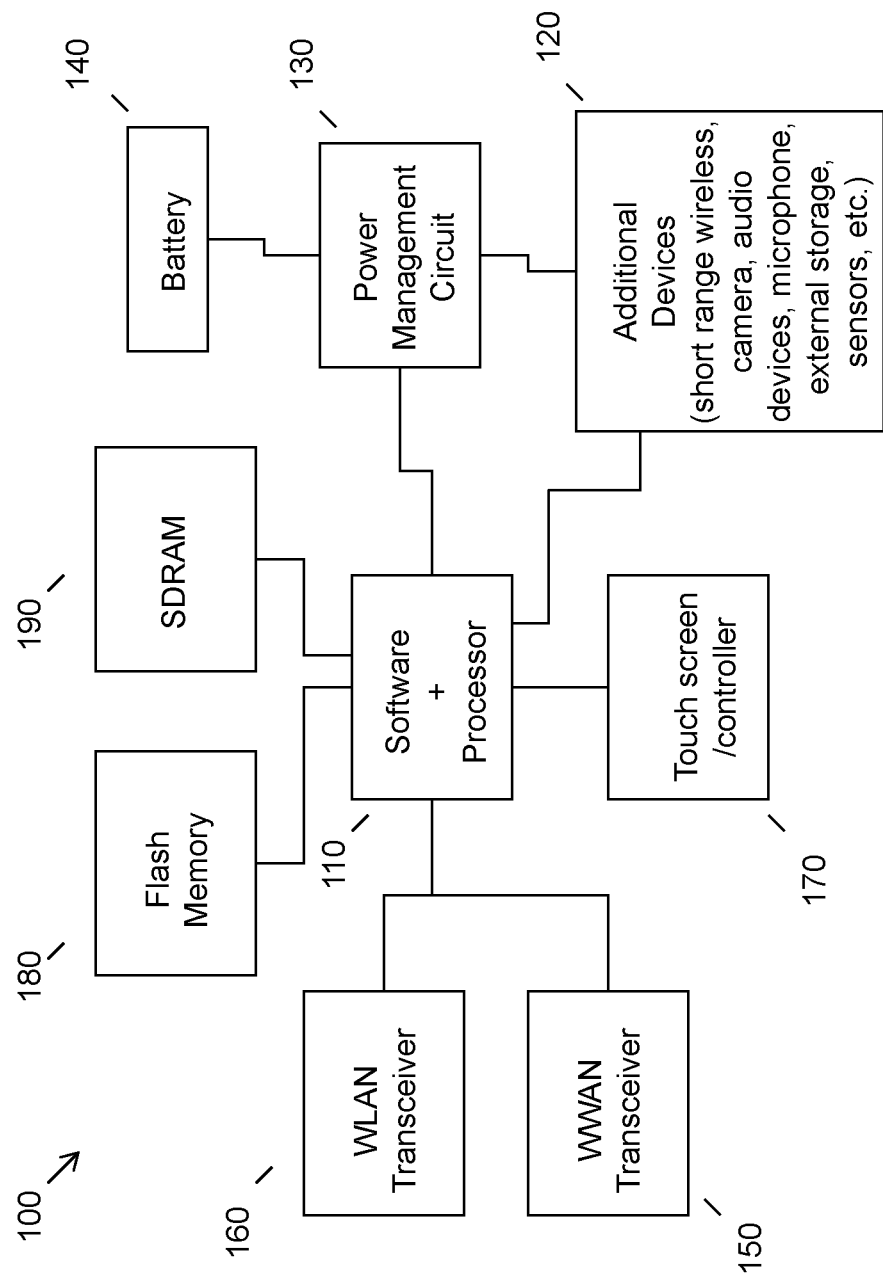
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An issue when providing voice input and commands to a device or application is determining when a user intends to provide speech to the device or application. Constantly listening to the user and trying to identify which voice input is intended for the system can be difficult and frequently results in a high number of false positives (i.e., the application or device responding to unrelated speech) and false negatives (i.e., the application or device ignoring voice input or commands intended for the device or application). In addition, the device or application constantly listening requires large amounts of processing and power requirements causing issues with speed and battery power usage.

One solution is the use of a trigger that requires the user to take some additional action so that the application or device can recognize that the user is going to provide voice input that should be processed. For example, some systems require the user start the application or press a particular button or series of buttons. As another example, a user has to use a key phrase to activate the voice processing or virtual assistant. Once a user provides the trigger to start the voice processing, the system listens for voice input or commands following the trigger. The system is then able to process the voice input or command and perform the action desired by the user.

Another solution that has been implemented is to require the user to provide a "jolt" or small movement to the device to "wake" the device. For example, a device may employ a method such as "raise to speak" where a user raises a device and the motion is detected (e.g., using an accelerometer). This type of solution is generally used with handheld or wearable devices and typically does not work if the user is holding the device in an upright position. Also, this method requires that the user is constantly holding the device in order to provide the movement, which may not be convenient or even feasible.

These technical issues present problems for users in that, in order for the device or application to start processing voice input, the user has to provide a trigger. Requiring a user to push a button, start an application, or "jolt" the device requires the user to disrupt whatever task they are currently performing. In particular, if a user is performing a task which requires use of their hands (e.g., cooking, using a computer, working on a car, driving a car, etc.) the user has to stop the task to provide the correct trigger. Providing a trigger phrase also creates issues for a user in that the user has to remember to provide the phrase before providing the voice input. This can disrupt a user's thoughts and undercut the benefit of the natural language aspect of providing the voice input. Additionally, the constant and repetitive nature of these trigger phrases may become bothersome to the user.

Accordingly, an embodiment provides a method of activating voice recognition based upon an action performed by a user. In one embodiment this action may include a gesture made by the user. The gesture may be captured by an image capture device or may be identified through the use of electromyography (EMG). The action may also include a thought by the user. Such a thought may be identified using electroencephalography (EEG). In the case of EMG or EEG, a device may be worn by a user to capture and/or analyze the electrical signals caused by muscle movement, in the case of EMG, or generated by the brain when a person is thinking, in the case of EEG. Upon identifying the data as an activation cue, an embodiment may activate the voice response system, which may include an application or a device. The application or device may then receive voice input and perform an action based upon the voice input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, electroencephalography sensors, electromyography sensors, and the like. System 100 often includes a touch screen 170 for data input and display/rendering. System 100 also typically includes various memory devices, for example flash memory 180 and SDRAM 190.

Figure 2:
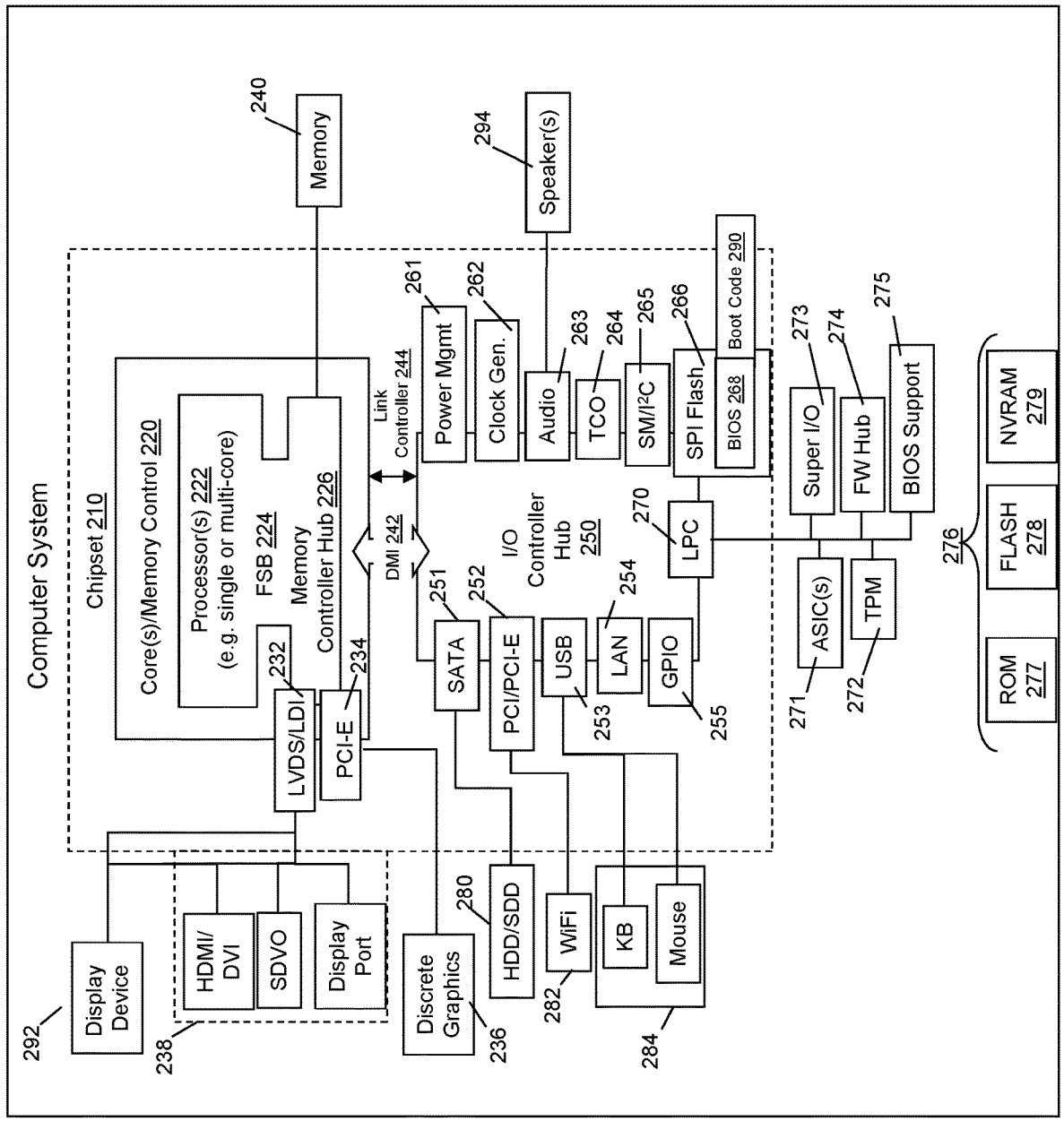
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, electromyography devices, electroencephalography devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use for voice input processing. As an example, the circuitry as outline in FIG. 1 and/or FIG. 2 may be used in a virtual assistant. The information handling device circuitry, as for example outlined in FIG. 1 or FIG. 2, may also be used to detect gestures or electrical signals generated by a user when the user is performing an action. For example, the circuitry outlined in FIG. 1 may be implemented in a tablet or smart phone embodiment, whereas the circuitry outlined in FIG. 2 may be implemented in a personal computer embodiment.

Figure 3:
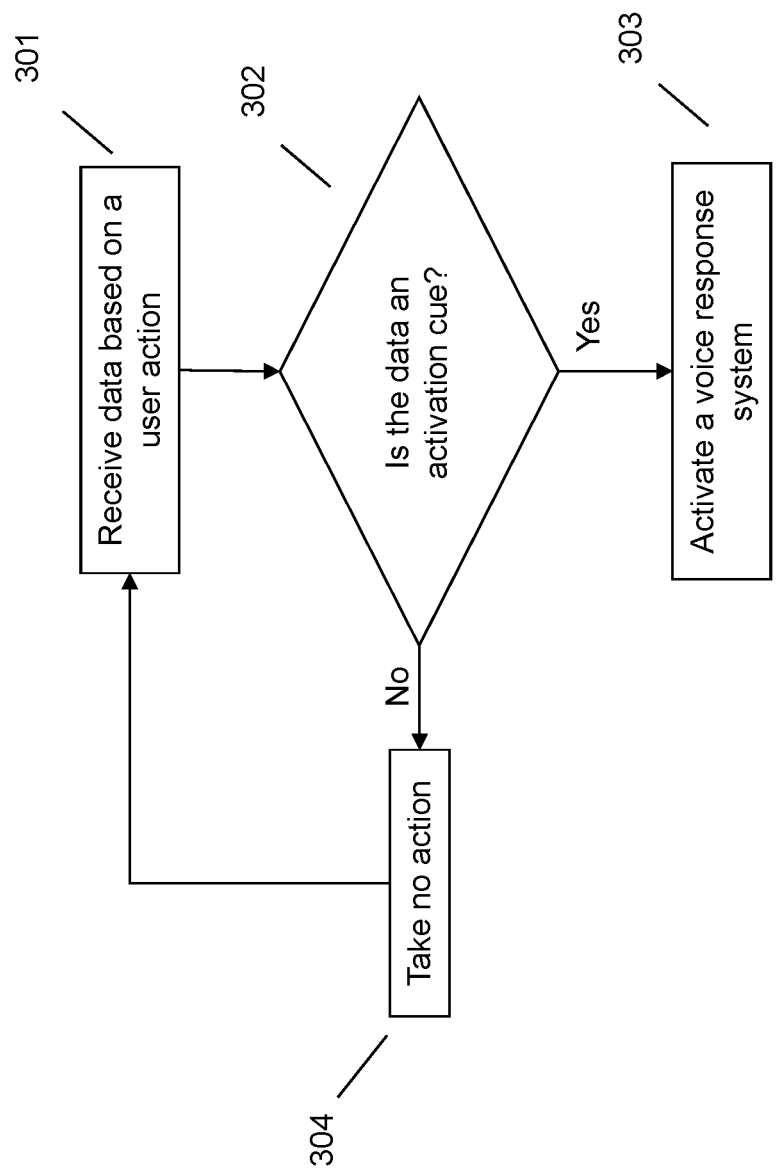
FIG. 3 illustrates an example method of user action activated voice recognition.

Referring now to FIG. 3, at 301, an embodiment may receive, from at least one sensor, data that may be based on an action performed by a user. The data may not be the exact data that was detected or received based upon the action performed by the user. For example, the device may analyze and process the data to determine what action the user has performed. The data may then include only the action performed, rather than the actual data collected from the user. As another example, the data may include only a subset or derivation of the data received based upon the action.

In receiving the data, an embodiment may receive the data directly from a source or may receive the data through a secondary source. For example, assume that a user is wearing a wearable device that can detect actions performed by the user, but the user is trying to provide voice input to a computer system. The wearable device may receive the data based upon the action by the user and then send the data to the computer system for processing or performing an action. The wearable device may also process the data before sending it to the computer system. Alternatively, the user may be wearing a wearable device that can detect actions performed by the user and also respond to voice input. In this case, the device may both detect the action and perform the action related to the voice input. Thus, receipt of the data may be from the action performed by the user or may be from an intermediary device.

The action performed by the user may be a gesture or may be the user thinking a thought. In detecting a thought, the sensors may include sensors that can detect electrical signals produced by the brain when a user is thinking, for example, using electroencephalography (EEG) technology. These electrical signals may also be produced when a user is performing movements or gestures, for example, moving a finger, toe, muscle, tongue, and the like. In one embodiment, the user may have to provide an activation cue to the device to start receiving the data. For example, if a wearable device detects EMG or EEG signals, a user may need to provide a small movement, "jolt", button press, or the like, to "wake" the device. This may prevent the device from having to continually process EMG or EEG signals.

Detecting a gesture may be accomplished using electromyography (EMG) technology or capturing the gesture via use of an image capture device (e.g., camera, video camera, infrared camera, etc.). Electromyography technology can detect electrical signals produced when a user moves muscles. Using the EEG or EMG technology may require that a user wear a device which can detect these electrical signals. For example, the user may wear a wearable wrist device to capture hand gestures with EMG technology. As another example, a user may wear a headband to capture electrical signals using the EEG technology. The device that captures the data related to the action performed by the user may not be attached to or touching the user. For example, an image capture device may be attached to a personal computer, gaming device, wall, and the like, rather than the user.

The data received may also include data from more than one sensor. In one embodiment, if more than one sensor that can detect a gesture or thought is accessible, the system may receive data from all of these sensors. The system may then process all the data. Alternatively, the system may only use data from the most accurate or reliable data source. In identifying the most accurate or reliable data source, the system may be preprogrammed to identify specific data as more accurate than other data. The system may also analyze the data to determine which data appears to be more accurate. For example, if some of the data appears to be very noisy, the system may deem that data to be less accurate than less noisy data. The system may also analyze the data from a primary source, which may be previously identified, and only use the additional data to augment the data from the primary source. For example, if the system identifies that after analyzing the data from the primary source, the system has a low confidence with the identification of what action was performed by the user, the system may use the additional data to clarify the primary data.

If the system has access to more than one device that can provide the data, the system may switch off certain devices. For example, if the user is in a location where both a wearable device and a camera are accessible, the system may turn off one of the devices. As an example, the system may turn off the wearable device in order to conserve the battery and only take data from the camera which may not be running off a battery. In turning off the device, the system may not turn off the device completely, but rather, may turn off the data collection feature of the device.

At 302, an embodiment may identify whether the data received comprises an activation cue. In identifying whether the data is an activation cue, an embodiment may compare the data received with previously stored data. The previously stored data may include data that is a factory setting or default for the device. For example, the default activation cue may include a clenched fist. Upon receiving data the system may determine whether the action performed was a clenched fist. The activation cue may also be set by the user. For example, the user may have a certain action that they want to perform in order as an activation cue. The activation cue may include a large movement, for example, an "okay" sign, raising a hand, and the like. The activation cue may also include a much smaller movement, for example, wiggling an ear, moving the mouth in a certain way, moving a single finger, and the like. Thus, the activation cue can be programmed to require as much or as little movement as the user would like to provide.

In some embodiments the activation cue may be of a type in which the movement is general enough that the system does not have to be trained to the specific user. For example, capturing a gesture with a camera may not require that the system be trained to the specific user. Additionally, in the case of EEG or EMG signals, some movements cause similar electrical signals for most users and thus would not require training. However, in one embodiment, the user may train the system to recognize actions by that particular user. The training may be used in the case where the user wants a particular movement to be treated as an activation cue. Training may also be implemented when the system is having difficulty recognizing movements by a user. Training may also be employed if the user chooses to do so or if factory defaults are not integrated into the system.

If the data does not comprise an activation cue at 302, an embodiment may take no action at 304 and may wait for additional data. If, however, the data does comprise an activation cue, an embodiment may activate a voice response system at 303. The voice response system may include a device (e.g., a digital assistant, smart watch, smart phone, laptop computer, etc.) or an application (e.g., voice recognition software, voice recognition application, etc.). An embodiment may then be activated which will receive voice input. An embodiment may further perform an action based upon the voice input. The action may include processing and analyzing the voice input. The action may also include providing a response to the user based upon the voice input. For example, the activation cue may alert a digital assistant that the voice input being received is meant to be processed by the digital assistant. As another example, the activation cue may alert voice recognition software to dictate voice input to a document.

In one embodiment, the system may process the voice input as long as the user continues to perform the gesture or holds the thought. For example, the activation cue may be a "thumbs up" sign. The user may have to hold the "thumbs up" sign for as long as the user is providing the voice input. As soon as the user stops providing the "thumbs up" sign, the system may stop receiving and processing the voice input. One embodiment may just require that the user provide the gesture or thought once and the user does not have to hold the gesture or thought. For example, the activation cue may include the user thinking of a hamburger. Once the user thinks of a hamburger, the system would not require the user to continually think of a hamburger to receive the voice input. The system may then stop processing the voice input when the user stops speaking, after the system has received enough voice input to recognize a command, after the user provides a stop gesture or input, or the like. In one embodiment, at least a portion of the voice input may be received before receiving the data or identifying the data as an activation cue. In this case, the system may maintain a rolling buffer of spoken input and use the last received voice input as input to the system.

The various embodiment described herein thus represent a technical improvement to voice response systems. Using the techniques described herein a user does not have to use repetitious trigger phrases, large movements, or button presses that may be inconvenient or cumbersome. As an example, rather than having to find the user's phone and press a button, the user can just move a single finger and the phone will respond. Thus, the user can provide a trigger for accepting voice input even if the user is not near the device they want to provide input to. Additionally, the user does not have to remember to provide a repetitive trigger phrase to activate the device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, from a user, a device activation cue, wherein the device activation cue activates a wearable device to start receiving electrical signal data, wherein the wearable device maintains a low power state prior to receiving the device activation cue;
receiving, from at least one sensor, located on the wearable device, the at least one sensor detecting electrical signals produced by a user from an action of the user, data, wherein the data is based upon an action performed by the user and electrical signals produced from the user;
identifying, using a processor, the data as an activation cue for a voice response system, wherein the identifying comprises identifying the action by analyzing the data to identify the action performed by comparing the data to previously stored data corresponding to identified actions stored as activation cues, wherein the analyzing comprises analyzing data received from a primary source and augmenting the data received from the primary source with data received from a second source on the wearable device to identify the action, wherein the second source comprises a voice input sensor, wherein a data collection feature of the second source activates in response to a low confidence score associated with identification of the action utilizing the primary source; and
activating, responsive to identifying the data as an activation cue, the voice response system, wherein the activating activates the voice response system for receiving a subsequent voice command.

2. The method of claim 1, further comprising:
receiving, from a voice input device, voice input; and
performing an action based upon a voice command included in the voice input.

3. The method of claim 2, wherein the receiving voice input comprises maintaining a buffer of voice input and wherein the voice command comprises at least a portion of the buffer of voice input received prior to receiving the data.

4. The method of claim 2, wherein the receiving voice input comprises receiving voice input while the action performed by the user is maintained.

5. The method of claim 1, wherein the action performed by a user comprises a gesture and wherein the receiving data comprises receiving electromyography data based on the gesture.

6. The method of claim 1, wherein the receiving data comprises receiving electroencephalography data based on a user's thought.

7. The method of claim 1, wherein the identifying the data as an activation cue comprises comparing the data to at least one predetermined activation cue.

8. The method of claim 7, wherein the at least one predetermined activation cue is selected by the user.

9. The method of claim 1, further comprising augmenting data received from the at least one sensor with data received from a second sensor.

10. An information handling device, comprising:
at least one sensor;
a processor operatively coupled to the at least one sensor;
a memory device that stores instructions executable by the processor to:
receive, from a user, a device activation cue, wherein the device activation cue activates a wearable device to start receiving electrical signal data, wherein the wearable device maintains a low power state prior to receiving the device activation cue;
receive, from the at least one sensor, located on the wearable device, the at least one sensor detecting electrical signals produced by a user from an action of the user, data, wherein the data is based upon an action performed by the user and electrical signals produced from the user;
identify the data as an activation cue for a voice response system, wherein the identifying comprises identifying the action by analyzing the data to identify the action performed by comparing the data to previously stored data corresponding to identified actions stored as activation cues, wherein the analyzing comprises analyzing data received from a primary source and augmenting the data received from the primary source with data received from a second source on the wearable device to identify the action, wherein the second source comprises a voice input sensor, wherein a data collection feature of the second source activates in response to a low confidence score associated with identification of the action utilizing the primary source; and
activate, responsive to identifying the data as an activation cue, the voice response system, wherein the activating activates the voice response system for receiving a subsequent voice command.

11. The information handling device of claim 10, wherein the instructions are further executable by the processor to:
receive, from a voice input device, voice input; and
perform an action based upon a voice command included in the voice input.

12. The information handling device of claim 11, wherein the instruction executable by the processor to receive voice input comprises an instruction to maintain a buffer of voice input and wherein the voice command comprises at least a portion of the buffer of voice input received prior to receiving the data.

13. The information handling device of claim 11, wherein the instruction executable by the processor to receive voice input comprises an instruction to receive voice input while the action performed by the user is maintained.

14. The information handling device of claim 10, wherein the action performed by a user comprises a gesture and wherein the instruction executable by the processor to receive data comprises an instruction to receive electromyography data based on the gesture.

15. The information handling device of claim 10, wherein the instruction executable by the processor to receive data comprises an instruction to receive electroencephalography data based on a user's thought.

16. The information handling device of claim 10, wherein the instruction executable by the processor to identify the data as an activation cue comprises an instruction to compare the data to at least one predetermined activation cue.

17. The information handling device of claim 10, wherein the instructions are further executable by the processor to augment data received from the at least one sensor with data received from a second sensor.

18. A product, comprising:
a storage device that stores code executable by a processor, the code being executable by the processor and comprising:
code that receives, from a user, a device activation cue, wherein the device activation cue activates a wearable device to start receiving electrical signal data, wherein the wearable device maintains a low power state prior to receiving the device activation cue;

code that receives, from at least one sensor, located on the wearable device, the at least one sensor detecting electrical signals produced by a user from an action of the user, data, wherein the data is based upon an action performed by the user and electrical signals produced from the user;

code that identifies the data as an activation cue for a voice response system, wherein the identifying comprises identifying the action by analyzing the data to identify the action performed by comparing the data to previously stored data corresponding to identified actions stored as activation cues, wherein the analyzing comprises analyzing data received from a primary source and augmenting the data received from the primary source with data received from a second source on the wearable device to identify the action, wherein the second source comprises a voice input sensor, wherein a data collection feature of the second source activates in response to a low confidence score associated with identification of the action utilizing the primary source; and code that activates, responsive to identifying the data as an activation cue, the voice response system, wherein the activating activates the voice response system for receiving a subsequent voice command.

* * * * *